(12) United States Patent
Theobald

(10) Patent No.: US 8,112,388 B2
(45) Date of Patent: Feb. 7, 2012

(54) DEPENDENCY PROCESSING OF COMPUTER FILES

(75) Inventor: Dietmar Theobald, Karlsruhe (DE)

(73) Assignee: SAP AG, Walldorf (DE)

( * ) Notice: Subject to any disclaimer, the term of this patent is extended or adjusted under 35 U.S.C. 154(b) by 528 days.

(21) Appl. No.: 12/184,932

(22) Filed: Aug. 1, 2008

(65) Prior Publication Data

US 2009/0037478 A1 Feb. 5, 2009

Related U.S. Application Data

(60) Provisional application No. 60/953,963, filed on Aug. 3, 2007.

(51) Int. Cl.
*G06F 17/30* (2006.01)
(52) U.S. Cl. ...................................................... 707/607
(58) Field of Classification Search ........... 707/2, 104.1, 707/607; 715/230
See application file for complete search history.

(56) References Cited

U.S. PATENT DOCUMENTS

| | | | |
|---|---|---|---|
| 6,356,946 B1 | 3/2002 | Clegg et al. | |
| 6,567,815 B1 | 5/2003 | Rubin et al. | |
| 6,694,323 B2 | 2/2004 | Bumbulis | |
| 6,851,112 B1 * | 2/2005 | Chapman | 718/1 |
| 6,856,993 B1 | 2/2005 | Verma et al. | |
| 2004/0093329 A1 | 5/2004 | Bergen et al. | |
| 2004/0249805 A1 | 12/2004 | Chuvilskiy | |
| 2004/0267732 A1 | 12/2004 | Luk et al. | |
| 2005/0033740 A1 | 2/2005 | Cao et al. | |
| 2005/0131867 A1 | 6/2005 | Wilson | |
| 2005/0166184 A1 * | 7/2005 | Takao | 717/117 |
| 2005/0216445 A1 | 9/2005 | Rao | |
| 2009/0037804 A1 * | 2/2009 | Theobald | 715/230 |

OTHER PUBLICATIONS

"A Program Annotation Facility for the Java Programming Language", *JSR-175 Public Draft Specification*, (2002-2003), 1-34.
"Getting Started with the Annotation Processing Tool (apt)", http://java.sun.com/j2se/1.5.0/docs/guide/apt/GettingStarted.html, (2004), 1-8.
"Package—Java 2 Platform Standard Edition Version 1.4.2", http://java.sun.com/j2se/1.4.2/docs/api/java/io/package-summary.html, (2003), 1-6.
Gosling, James , et al., "The Java Language Specification Third Edition", *Addison Wesley*—, (May 2005), 259-286 & 356-358.
USPTO, "6570P471 OA Mailed Oct. 29, 2008 for U.S. Appl. No. 11/648,065", (Oct. 29, 2008), Whole Document.

* cited by examiner

*Primary Examiner* — Etienne Leroux
(74) *Attorney, Agent, or Firm* — Schwegman, Lundberg & Woessner, P.A.

(57) ABSTRACT

A method and apparatus for dependency processing of computer files. An embodiment of a method for dependency processing of computer files includes receiving a data stream input at a scanner component, where the data stream input represents multiple computer files. The data stream input is scanned for data types, where scanning the data stream input includes encountering a definition of a data type; determining whether to process program elements within the data type, and, if there is a determination to process the program elements in the data type, scanning the program elements of the data type to identify usages of the data type. The identified data type definition and data type usages are provided to a listening component.

16 Claims, 9 Drawing Sheets

US 8,112,388 B2

DEPENDENCY PROCESSING OF COMPUTER FILES

RELATED APPLICATIONS

This application is related to and claims priority to U.S. provisional patent application 60/953,963, entitled "Dependency Processing of Computer Files", filed Aug. 3, 2007, which is hereby incorporated herein by reference in its entirety.

This application is further related to:

U.S. patent application Ser. No. 11/648,065, entitled "Computer File System Traversal", filed Dec. 20, 2006;

U.S. patent application Ser. No. 12/184,896, entitled "Computer Archive Traversal", filed Aug. 1, 2008, claiming priority to U.S. provisional application 60/953,932, filed Aug. 3, 2007;

U.S. patent application Ser. No. 12/184,904, entitled "Computer File Processing", filed Aug. 1, 2008, claiming priority to U.S. provisional application 60/953,933, filed Aug. 3, 2007;

U.S. patent application Ser. No. 12/184,911, entitled "Annotation Processing of Computer Files", filed Aug. 1, 2008, claiming priority to U.S. provisional application 60/953,935, filed Aug. 3, 2007;

U.S. patent application Ser. No. 12/184,915, entitled "Annotation Data Filtering of Computer Files", filed Aug. 1, 2008, claiming priority to U.S. provisional application 60/953,937, filed Aug. 3, 2007;

U.S. patent application Ser. No. 12/184,924, entitled "Annotation Data Handlers for Data Stream Processing", filed Aug. 1, 2008, claiming priority to U.S. provisional application 60/953,938, filed Aug. 3, 2007; and U.S. patent application Ser. No. 12/184,938, entitled "Data Listeners for Type Dependency Processing", filed Aug. 1, 2008, claiming priority to U.S. provisional application 60/953,964, filed Aug. 3, 2007.

TECHNICAL FIELD

Embodiments of the invention generally relate to the field of computer systems and, more particularly, to a method and apparatus for type dependency processing of computer files.

BACKGROUND

In the formation of computer files, there may be certain data type dependencies in place. For example, any Java class file holds a particular defined Java class type defining many features of that Java data type. In the analysis of software artifacts, knowledge regarding data type dependency can be helpful in analyzing relationships between the artifacts.

However, to understand the data type dependencies it is generally necessary to search through the relevant computer files to determine what data type dependencies are present. This process can take a significant amount of time because the data type definitions may be scattered throughout the files. For example, the class of each Java class file is provided in the class file, thus requiring that each class file be examined to make any determinations regarding data type occurrences in the computer files.

SUMMARY OF THE INVENTION

A method and apparatus are provided for dependency processing of computer files.

In a first aspect of the invention, an embodiment of a method for dependency processing of computer files includes receiving a data stream input at a scanner component, where the data stream input represents multiple computer files. The data stream input is scanned for data types, where scanning the data stream input includes encountering a definition of a data type; determining whether to process computer program elements within the data type, and, if there is a determination to process the program elements in the data type, scanning the program elements of the data type to identify usages of the data type. The identified data type definition and data type usages are provided to a listening component.

In a second aspect of the invention, an embodiment of a data dependency processing system includes a data scanning module and a data listening module. The data scanning module is to receive a data stream input containing multiple computer program elements and to scan the data stream input to identify data type definitions and usages of the data types. The data listening module is to receive the identified data type definitions and data type usages, and to generate a data stream output containing the identified data type definitions and the usages of the data types.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
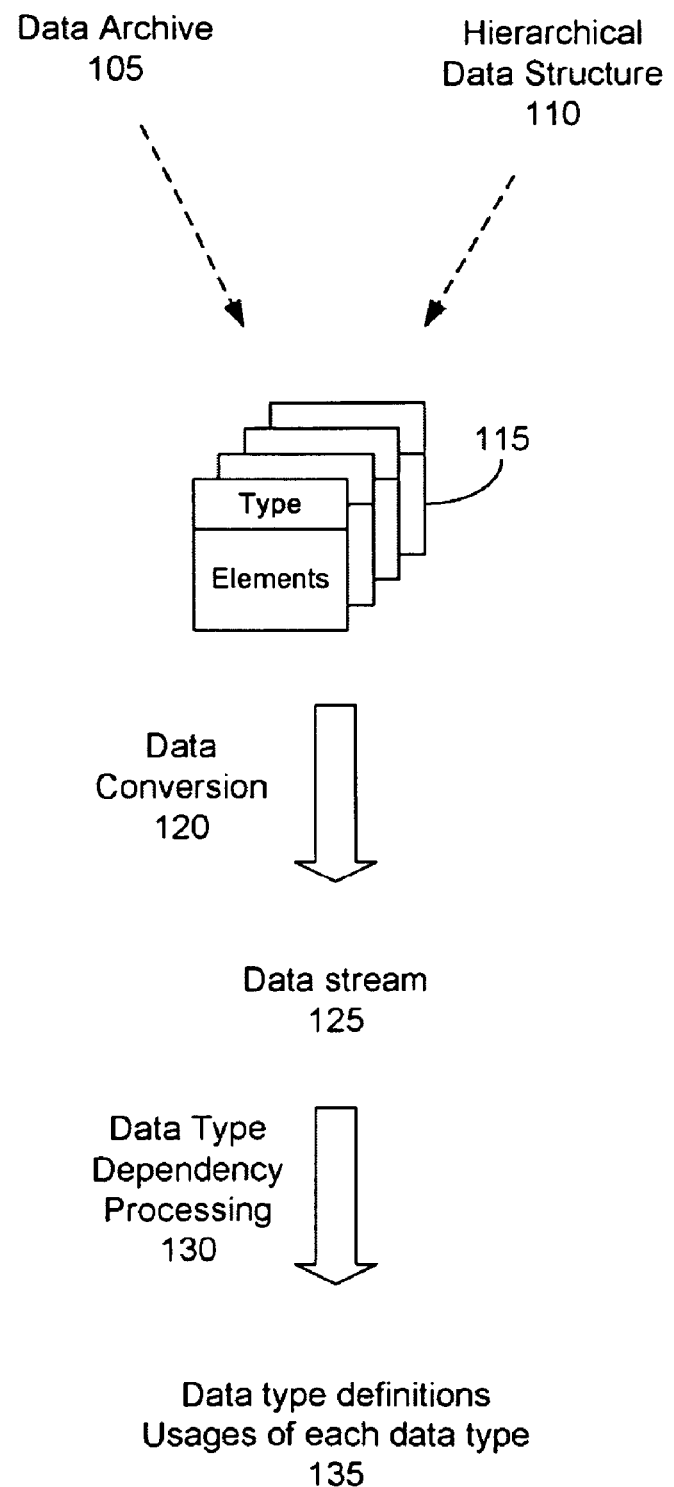
FIG. 1 is an illustration of data type dependency processing.

Embodiments of the invention are generally directed to type dependency processing of computer files.

As used herein:

"Data type" means a classification of software artifacts stored in a computer file. Data type includes, but is not limited to, a type of a Java class file.

"Computer file" means any file structure used in a computer system. Computer files include files with specific required structures, including Java class files.

"Class file" means a Java class file. A Java class file is a defined format for compiled Java code, which may then be loaded and executed by any Java virtual machine. The format and structure for a Java class file is provided in JSR 000202, Java Class File Specification Update (Oct. 2, 2006) and subsequent specifications.

"Traversal" means a process for progressing through the elements of a computer system, including a process for progressing through the elements of a computer archive.

"Archive" means a single file that may contain one or more separate files. An archive may also be empty. The files within an archive are extracted, or separated, from the archive for use by a computer program. The files contained within an archive are commonly compressed, and the compressed files are decompressed prior to use. An archive may further include data required to extract the files from the archive. "Archive" may also refer to the act of transferring one or more files into an archive.

In an embodiment of the invention, computer files are processed to identify data type occurrences and the usages of the data types. In an embodiment, the computer files are in the form of a serial data stream, with the data stream being scanned for data type definitions. In one embodiment, a set of computer files includes a set of Java class files. In an embodiment of the invention, computer files are extracted into a neutral format to allow efficient filtering of data types.

In an embodiment of the invention, a process is provided to receive a data stream input representing a computer program or other computer files, scan the data stream for data types, and to generate a data stream output. The data stream output includes identified data types and the usages of the data types.

In an embodiment of the invention, a processing system includes a scanning module to scan the data stream input and output a data stream that includes selected data types and data type usages. In an embodiment, the processing system further includes a listening module to manage the data stream output and potentially provide further filtering or other functions. In an embodiment, a file processing system may include additional listener modules to provide other functions. In one embodiment of the invention, a dedicated, independent processing module is provided for data type processing, but embodiments of the invention are not limited to a dedicated module implementation.

In an embodiment of the invention, a set of computer files are scanned in a single pass as a serial data stream without requiring multiple readings of the file data. In an embodiment, the same serial data stream format is maintained both on input and output, thereby allowing further processing of computer files without further file conversion.

In an embodiment, the conversion of the data into a data stream allows processing without any dependency on random access files, and broadens the applicable scope of the process for the input. In an embodiment, the processing of class files as a data stream allows processing without requiring use of, for example, Java library utilities that may normally be required to conduct the file processing.

In an embodiment of the invention, the conversion of computer files to a data stream allows for the use of a protocol for both the data producer (the computer file processor) and the data consumer without creating a complete file representation, thereby simplifying the data structure. In an implementation for Java class files, the processing system operates with a class file data model, without requiring the addition of any major abstraction for data processing.

In an embodiment, the conversion of computer files to a serial data format may include, but is not limited to, the operation of a traversal of a hierarchical data structure or of a data archive as provided respectively in patent application Ser. No. 11/648,065, entitled "Computer File System Traversal", filed Dec. 30, 2006. Other processes for conversion of a set of files to a serial data stream may also be utilized in embodiments of the invention.

In an embodiment of the invention, processing is designed to provide sufficient performance for overall computer file processing. For example, in an embodiment a system includes stream buffering to buffer data as it is obtained and processed.

In addition, an embodiment of the invention provides a compact internal file state in the data stream, thereby minimizing the amount of data that will be required in the process of transferring and processing the computer files.

In an embodiment of the invention, a data scanner may be provided in multiple implementations, depending on the system requirements. A data scanner may be a portion of a file processor. In one example, native processing implementations may be provided for a computer file scanner, with the native implementations being based upon relevant Java standards. In another example, a non-native implementation may be provided, as required. A particular non-native implementation may include a BCEL (Byte Code Engineering Library) implementation, with the BCEL API being a toolkit for the static analysis and dynamic creation or transformation of Java class files.

In an embodiment of the invention, a data consumer that receives output data is a main framework extension point for which neutral utility implementations might be required. In an embodiment of the invention, a file processor (the data producer) operates using the same data protocol as the data consumer protocol. In an embodiment of the invention, the data consumer may have control over the data to be provided to the data consumer. In an embodiment, the data producer and the data consumer may cooperate to agree on the data to be provided from the serial data stream. In an embodiment of the invention, a system may include complexity control, including configuring the file processor to deliver the data of interest. In an embodiment, the data of interest includes data meeting a certain degree of detail, or certain types of data. In an embodiment of the invention, the structure of the data processing may allow for a system to be utilized with loose semantics and implementation constraints. For example, the technical framework and protocol data types may be defined. However, there may be leeway for implementation characteristics, such as the result order sequence and analysis capabilities.

In an embodiment of the invention, file processing may be included within a set of tools that are provided to search files. The tools may, for example, provide for the conversion of files into serial form by a traversal process, the scanning of data for desired elements, and other related processes.

FIG. 1 is an illustration of data type dependency processing. As shown, computer files containing data types 115 may be derived from various different forms of storage. For example, the data may be stored in a data archive 105 or in a hierarchical data structure 110. The computer files 115 may include, but are not limited to, Java class files. In an embodiment, the computer files 115 are subjected to a data conversion 120 to generate a data stream 125 for processing. The data stream 125 is then provided to a data type dependency process 130, resulting in an output containing the data type definitions found in the computer files and the usages of each data type 135.

Figure 2:
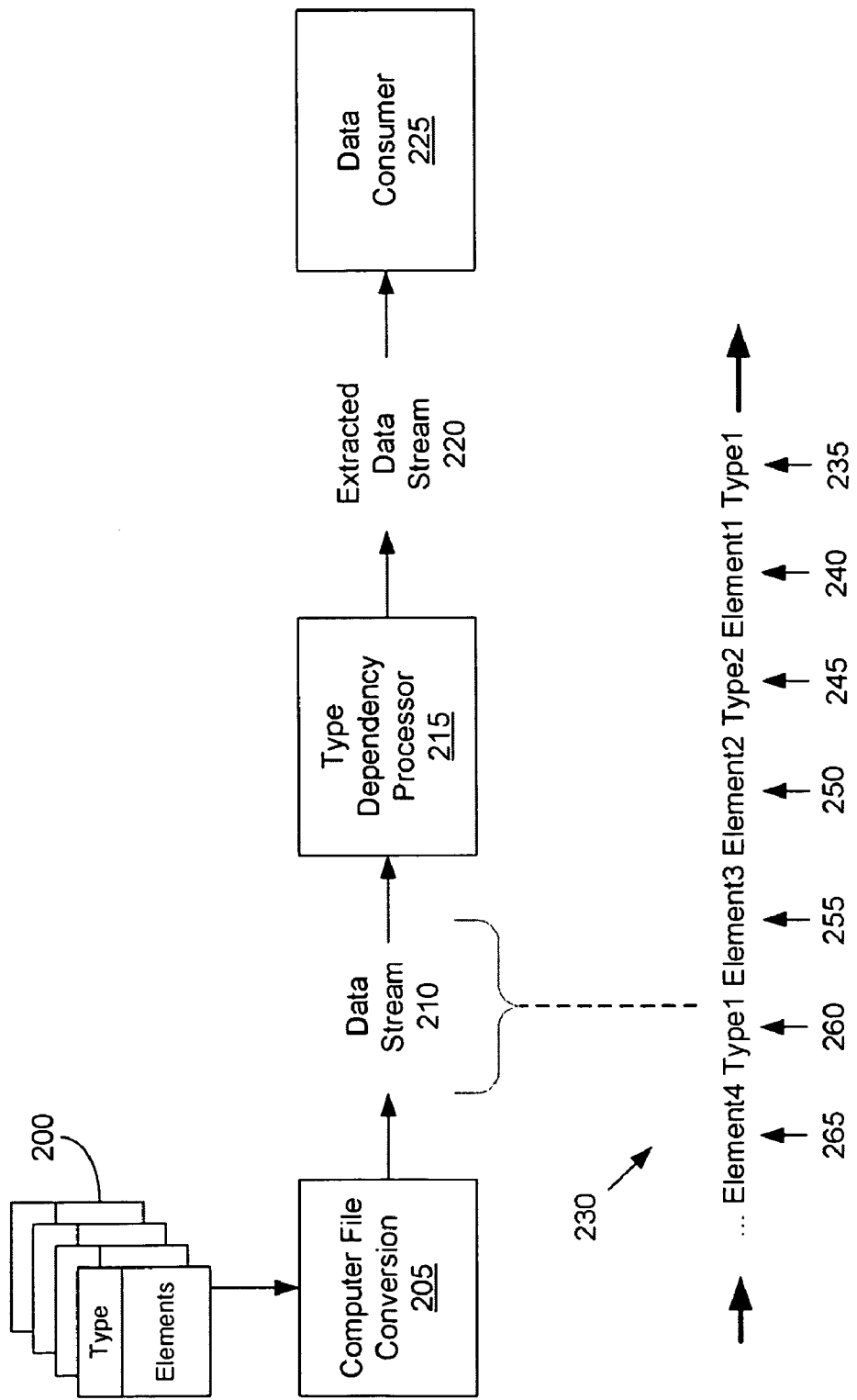
FIG. 2 is an illustration of an embodiment of processing of computer file data.

FIG. 2 is an illustration of an embodiment of processing of computer file data. In this illustration, a computer file conversion module 205 is provided to convert computer file data 200 into a serial data stream 210. The computer file data 200 may be, but is not limited to, Java class file program elements. The conversion of the computer file data may include, but is not limited to, the traversal of a hierarchical file or archive. The output of the processing of computer file data is a serial data stream 210 representing the computer file data.

In an embodiment, the serial data stream is a serial representation of the data type definitions and the data elements within each such data type. For example, the data stream 210 is illustrated as a series of program elements arriving as a data stream 230. In this data stream, there is a type definition prior to any elements within the type. For example, Type1 235 is a first type definition, which is followed by program element Element1 240 within Type1. The data stream further includes a second type definition Type2 245, which includes program elements Element2 250 and Element3 255. Further, Type1 260 is found again in the data stream, containing Element4 265.

In an embodiment of the invention, the serial data stream 210 then is provided to a type dependency processor 215, which processes the data, including scanning the data stream 210 for data type definitions and the usages of each such data type. The processor 215 may contain multiple modules or sub-modules, depending on the particular embodiment. The processor 215 outputs an extracted data stream 220, which represents elements of the data stream 210 that have been selected by the processor 215. In this implementation, the extracted data stream 220 would contain data type definitions and associated usages of each such data type. The extracted data stream 220 then is eventually provided to a data consumer 225. The data consumer 225 may receive additional reports or data processing as required for the needs of the consumer 225.

Figure 3:
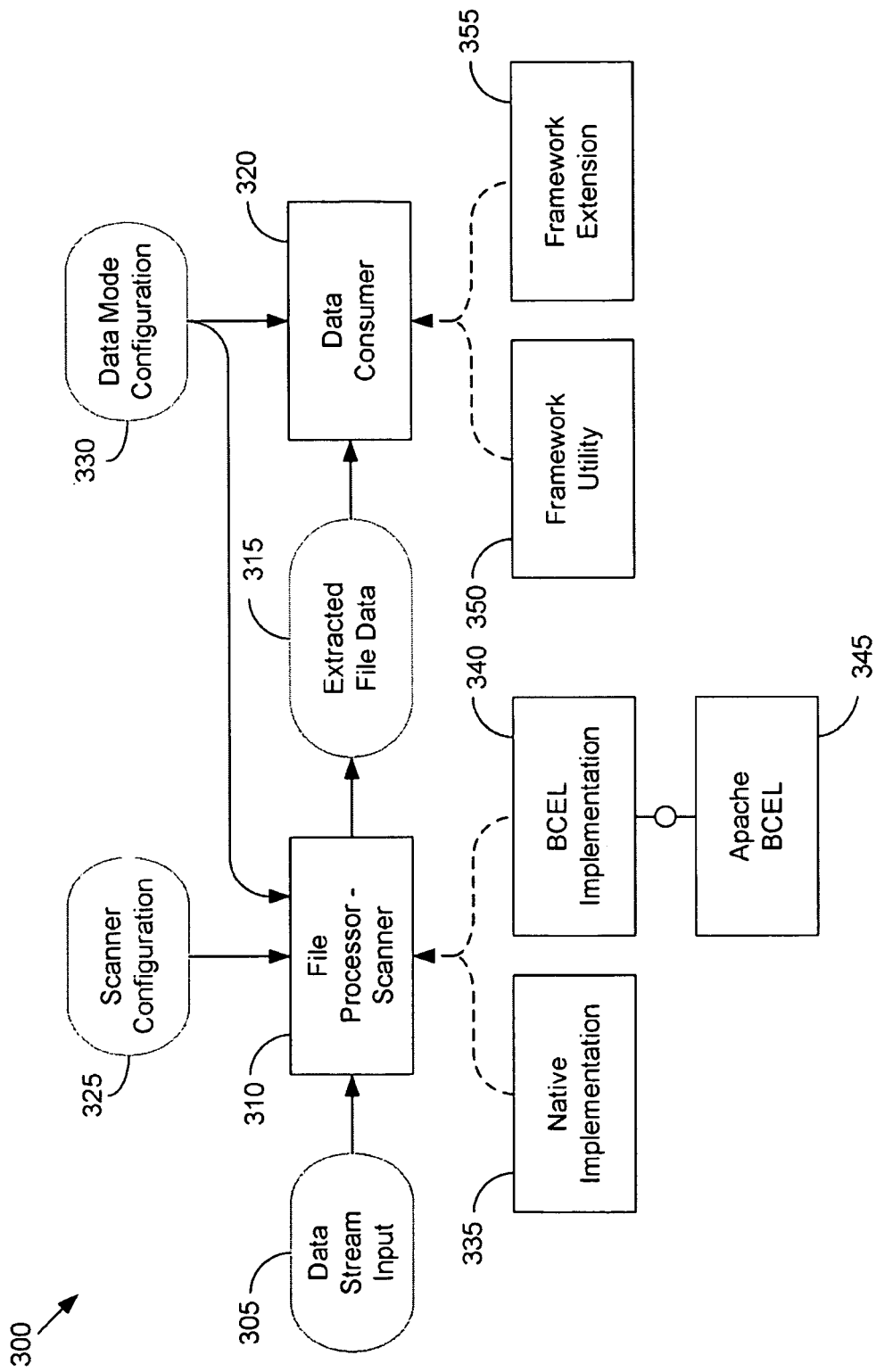
FIG. 3 is an illustration of a computer file processing system.

FIG. 3 is an illustration of a computer file processing system 300. While this illustration shows the processes occurring within a single system for simplicity in description, the processes may occur in multiple systems, including multiple systems within a network. In this illustration, a computer file data stream input 305 is provided to a file processor 310, which may include a scanner to scan the data for desired program elements. The data stream 305 may, for example, represent Java class file data that has been converted into a serial data stream. The file processor 310 may include multiple components, depending on the particular embodiment of the invention. The file processor 310 generates an extracted computer file data stream 315, which may be presented to a data consumer 320.

In an embodiment of the invention, the operation of the computer file processing system 300 is directed by certain inputs and settings. The operation of the file processor 310 may be directed by a scanner configuration 325. In addition, a data mode configuration 330 affects both the file processor 310 and the data consumer 320. The file processor 310 also may include one of multiple implementations. In particular embodiments, the implementation may be a native implementation 335 or a BCEL (Byte Code Engineering Library) implementation 340. The BCEL implementation 340 may include the Apache BCEL process 345, as developed by the Apache Software Foundation. In addition, the consumer 320 may utilize a framework utility 350 and a framework extension 355 in the operation of the computer file processing.

Figure 4:
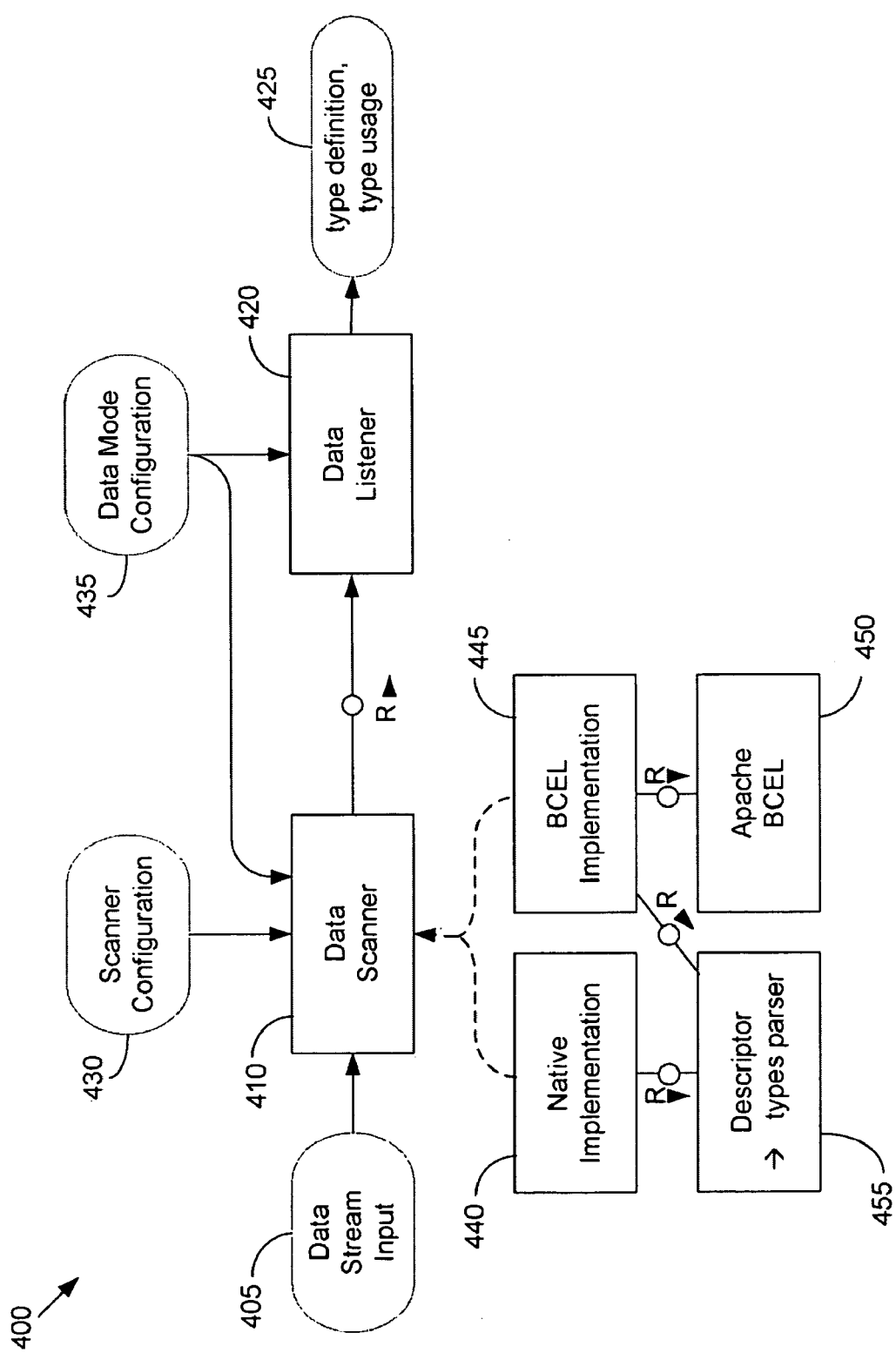
FIG. 4 is an illustration of an embodiment of a system to process annotated program elements.

FIG. 4 is an illustration of an embodiment of a system to process annotated program elements. The system 400 may include a data scanner 410 and a data handler 420. The data scanner 410 may, for example, represent the file processor 310 illustrated in FIG. 3 or a subpart of the file processor 310. The data handler 420 may represent the data consumer 320 illustrated in FIG. 3 or a subpart of the data consumer 310. In this illustration, the data scanner 410 is to scan a received data stream input 405 for data type definitions and usages of data types, and to produce a data stream containing selected data type definitions and usages. The data listener 420 is to receive and handle the output of the scanner 410.

The data scanner 410 may include a native implementation 440 and a BCEL implementation 445, illustrated with Apache BCEL 450. The implementations may be associated with a parsing module 455 to parse type descriptors and identify the appropriate data types.

Figure 5:
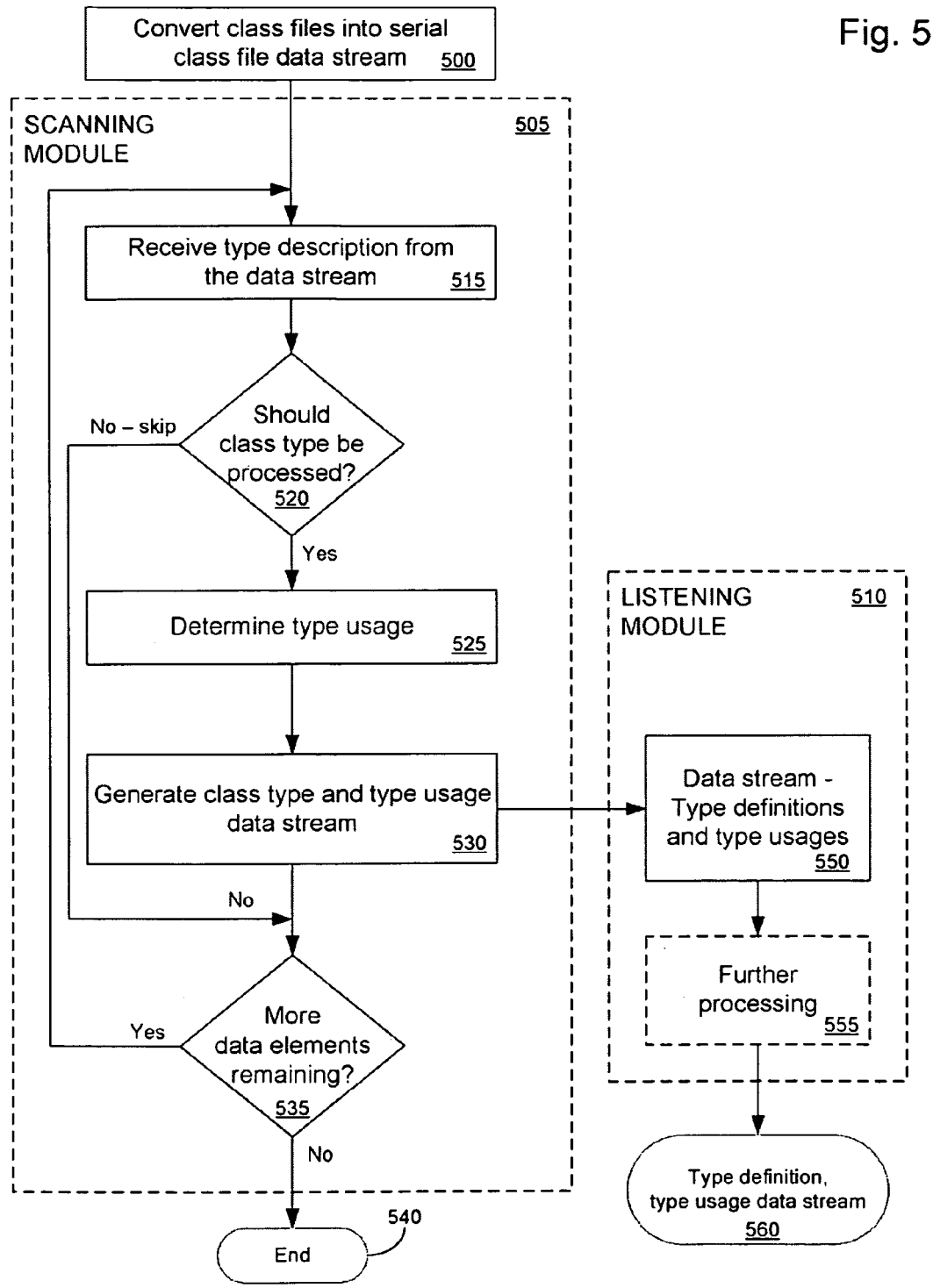
FIG. 5 is a flowchart to illustrate an embodiment of type dependency processing of class files.

FIG. 5 is a flowchart to illustrate an embodiment of type dependency processing of class files. In this illustration, a set of class files is converted into a serial class file data stream 500. The class file data stream may include, but is not limited to, a data stream generated through the traversal of a hierarchical file system or an archive.

The serial class file data stream 500 is received by a scanning module 505, which operates in conjunction with a listening module 510 to identify and output data type definitions and usages that are of interest in the data stream. In this process, a particular type description is received in the data stream 515. There is then a determination whether the elements of the class type should be processed 520. If the scanning module 505 determines that program elements in the class type should not be processed, then the elements in the class type are skipped and the process continues to a determination whether there are more program elements remaining 535. If the class is of interest, then the scanning module 505 determines the type usage or usages of the data type 525.

The scanning module then generates a class type and type data stream 530, and provides the listening module 510 with the identified type definitions and usages 550. If there are more program elements available in the data stream input, the scanning module continues with the next type description 515. When no more program elements remain in the received data stream, then the process ends 540. Within the listening module 510, there may be additional processing 555, including further filtering, as required. The output from the listening module 510 contains the selected type definitions and type usages. The processing of program elements may include other processes not illustrated here, depending on the embodiment of the invention.

Figure 6:
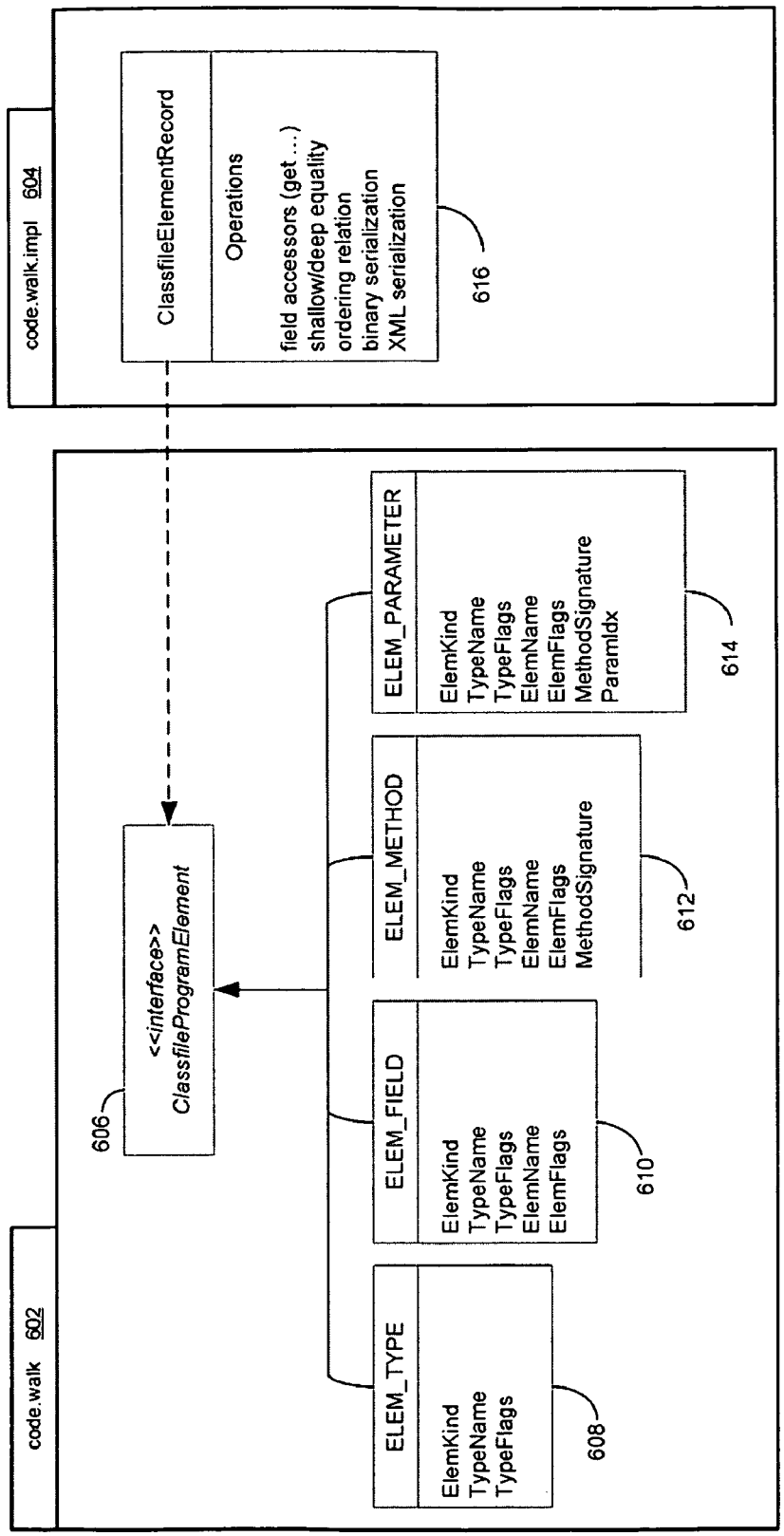
FIG. 6 is an illustration of an embodiment of a class file program element as a data stream.

FIG. 6 is an illustration of an embodiment of a class file program element as a data stream. In this illustration, a class file program element 606 is shown within a code walk module 602 (used in the traversal of class files). The class file program element 606 is represented by an element type 608 (including an element kind, type name, and type flags), an element field 610 (also including an element name and element flags), and one or more element methods 612 (also including a method signature), and an element parameter 614 (paramldx). The element further includes a class file element record 616 in the code walk implementation 604, including one or more operations (defining field accessors, shallow or deep equality, ordering relation, binary serialization, and XML serialization).

Figure 7:
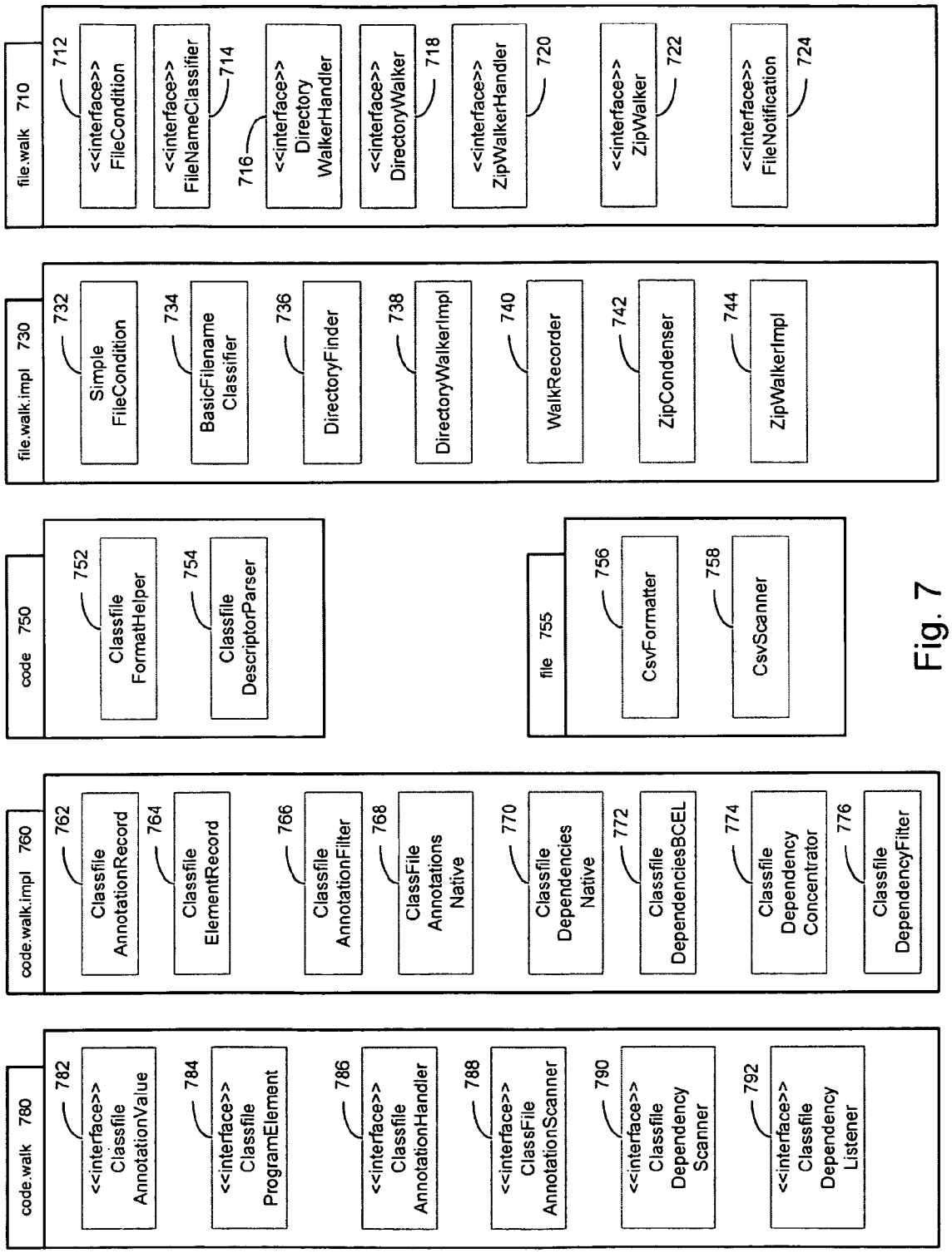
FIG. 7 illustrates an embodiment of library utilities.

FIG. 7 illustrates an embodiment of library utilities. FIG. 7 may illustrate software modules, hardware modules, or modules including a combination of software and hardware. In this illustration, the utilities relate to an interface layer comprising code walk interfaces (code.walk 780); for class file processing and file walk interfaces (file.walk 710) for locating files; and further to an implementation toolbox comprising code processing 750 and a code walk implementation (code.walk.impl 760) for class file processing, and file processing 755 and a file walk implementation (file.walk.impl 730) for locating files.

In the interface layer, the code walk interfaces 780 may include a class file annotation value interface module 782, a class file program element interface module 784, a class file annotation handler interface module 786, a class file annotation scanner interface module 788, a class file dependency scanner interface module 790, and a class file dependency listener interface module 792. The file walk interfaces then may include a file condition interface module 712, a file name classifier interface module 714, a directory walker handler interface module 716, a directory walker interface module 718, a zip walker handler interface module ("zip" indicating use for archives) 720, a zip walker interface module 722, and a file notification interface module 724.

In an embodiment of the invention, the code processing 750 may provide for parsing types from class file descriptors. Code processing 750 may include a class file format helper module 752 and a class file descriptor parser module. The code walk implementation 760 for class file processing may include a class file annotation record module 762, a class file element record module 764, a class file annotation filter 766, a class file annotation for native elements 768, a class file dependencies module for native elements 770, a class file dependencies module for BCEL (Byte Code Engineering Library) elements 772, a class file dependency concentrator module 774, and a class file dependency filter 776.

In an embodiment of the invention, the file processing 755 may include a comma separated value (CSV) formatter and a CSV scanner. The file walk implementation 730 for locating files may include a simple file condition module 732, a basic file name classifier module 734, a directory finder module 736, a directory walker implementation module 738, a walk recorder module 740, a zip (archive) condenser module 742, and a zip walker implementation module 744.

Figure 8:
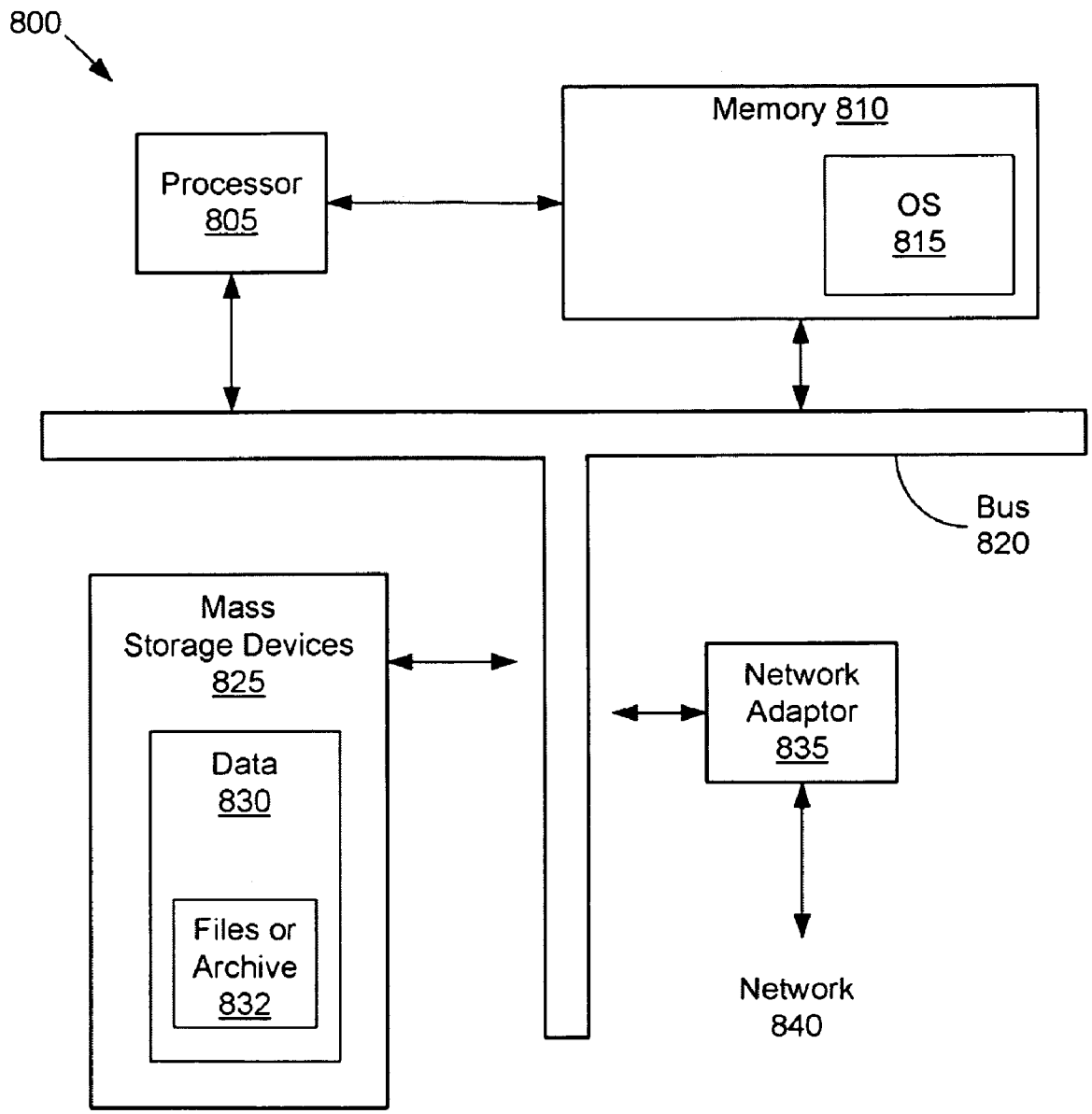
FIG. 8 is an illustration of a computer system in an embodiment of the invention.

FIG. 8 is an illustration of a computer system in an embodiment of the invention. The computer system may be utilized as a system for processing of computer files in the form of a data stream, or may represent one of multiple systems used in such processing. The computing system illustrated in FIG. 8 is only one of various possible computing system architectures, and is a simplified illustration that does include many well-known elements. As illustrated, a computing system 800 can execute program code stored by an article of manufacture. Computer system 800 may be a J2EE system, ABAP (Advanced Business Application Program) system of SAP AG, or administration system. A computer system 800 includes one or more processors 805 and memory 810 coupled to a bus system 820. The bus system 820 is an abstraction that represents any one or more separate physical buses, point-to-point connections, or both connected by appropriate bridges, adapters, or controllers. The bus system 820 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 8, the processors 805 are central processing units (CPUs) of the computer system 800 and control the overall operation of the computer system 800. The processors 805 execute software stored in memory 810. A processor 805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 810 is or includes the main memory of the computer system 800. Memory 810 represents any form of random access memory (RAM), read-only memory (ROM), flash memory, or the like, or a combination of such devices. Memory 810 stores, among other things, the operating system 815 of the computer system 800.

Also connected to the processors 805 through the bus system 820 are one or more mass storage devices 825 and a network adapter 835. Mass storage devices 825 may be or may include any conventional medium for storing large volumes of instructions and data 830 in a non-volatile manner, such as one or more magnetic or optical based disks. In an embodiment of the invention, the mass storage devices may include storage of file or an archive 832 that requires processing. In an embodiment of the invention, the processors 805 may operate to traverse the files or archive 832, the traversal of the files or archive 832 resulting in output of a serial data stream representing selected elements of the archive. The processor 805 may scan the serial stream for desired program elements within the computer files. In another embodiment the computer system 800 may provide for the conversion of the computer files into a serial data stream, while another system or systems is responsible for scanning the data stream for desired program elements.

The network adapter 835 provides the computer system 800 with the ability to communicate with remote devices, over a network 840 and may be, for example, an Ethernet adapter. In one embodiment, the network adapter may be utilized to output data including, for example, an extracted serial data stream representing selected elements of the files or archive 832.

Figure 9:
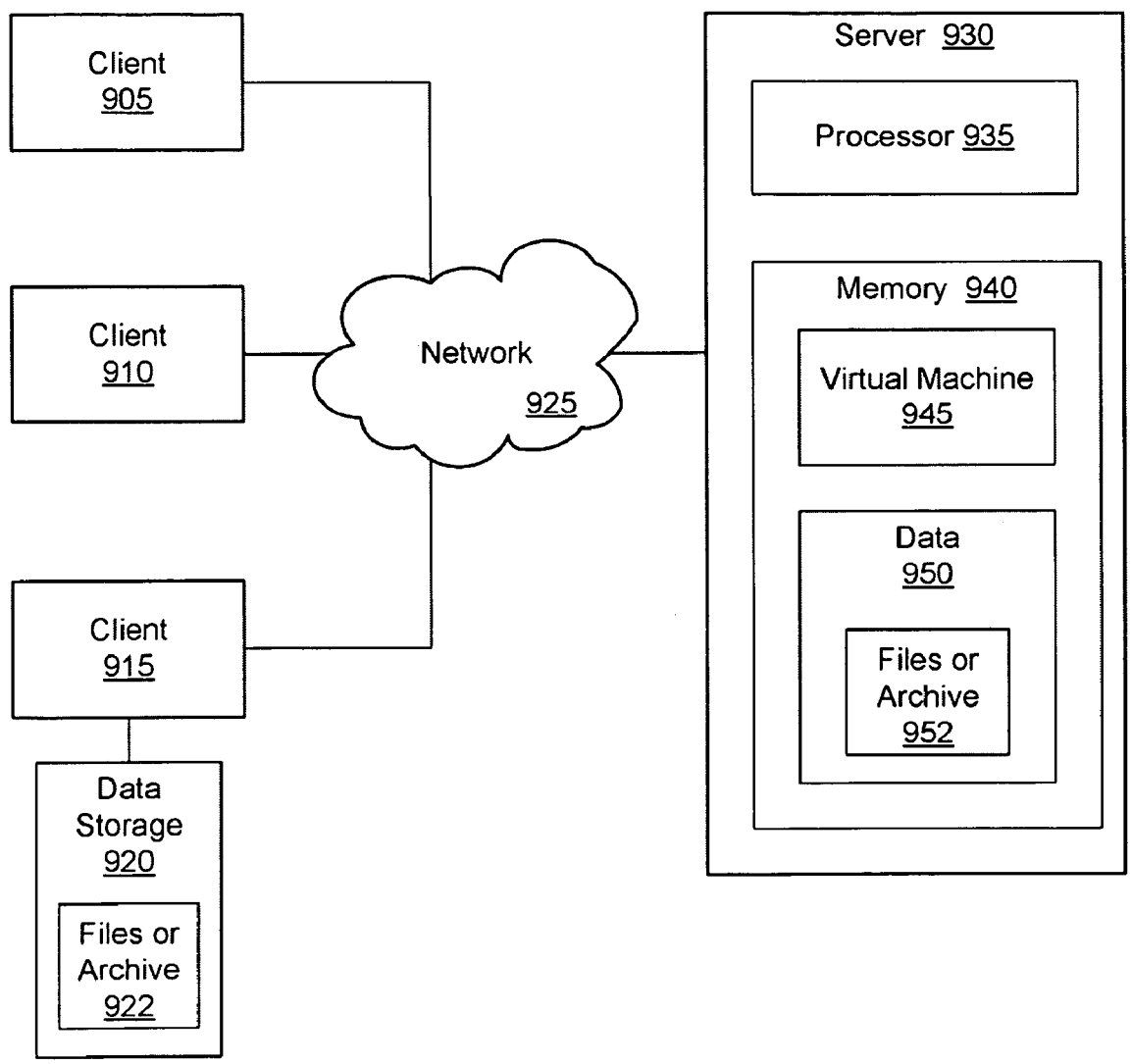
FIG. 9 illustrates an embodiment of a client-server network system.

FIG. 9 illustrates an embodiment of a client-server network system. As illustrated, a network 925 links a server 930 with client systems 905, 910, and 915. Client 915 may include certain data storage 920, including computer files in the form of, for example, a computer file hierarchy or computer archive 922. Server 930 includes programming data processing system suitable for implementing apparatus, programs, and/or methods in accordance with one or more embodiments of the present invention. Server 930 includes processor 935 and memory 940. Server 930 provides a core operating environment for one or more runtime systems, including, for example, virtual machine 945, at memory 940 to process user requests. Memory 940 may include a shared memory area that is accessible by multiple operating system processes executing in server 930. For example, virtual machine 945 may include an enterprise server (e.g., a J2EE-compatible server or node, Web Application Server developed by SAP AG, WebSphere Application Server developed by IBM Corp. of Armonk, N.Y., and the like). Memory 940 can be used to store an operating system, a Transmission Control Protocol/Internet Protocol (TCP/IP) stack for communicating over network 925, and machine executable instructions executed by processor 935. The memory 945 may also include data 950 for processing, including the processing of data that includes data of one or more computer file hierarchies or computer archives 952. In an embodiment, the data has been converted into a serial data stream for processing. In some embodiments, server 935 may include multiple processors, each of which can be used to execute machine executable instructions.

Client systems 905-915 may execute multiple application or application interfaces. Each instance or application or application interface may constitute a user session. Each user session may generate one or more requests to be processed by server 930. The requests may include instructions or code to be executed on a runtime system, such as virtual machine 945 on server 930.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method for dependency processing of computer files comprising:
   receiving a data stream input at a scanner component executing on one or more processors, the data stream input representing a plurality of computer program elements;
   scanning the data stream input for data types, scanning the data stream input including:
   encountering a definition of a data type,
   determining whether to process the program elements within the data type, and if there is a determination to process the program elements in the data type, scanning the program elements of the data type to identify usages of the data type;
   providing the identified data type definition and data type usages to a listening component and
   wherein the plurality of program elements comprises Java class file program elements.

2. The method of claim 1, further comprising generating a data stream output from the listening component containing identified data type definitions and usages of the identified data types.

3. The method of claim 2, wherein the data stream output and the data stream input have the same data format.

4. The method of claim 1, wherein the scanning of the data stream input is based at least in part on a configuration.

5. The method of claim 4, wherein the configuration includes a scanner configuration and a data mode configuration.

6. The method of claim 1, further comprising converting a set of class files into the data stream input.

7. A data dependency processing system comprising:
   a data scanning module executing on one or more processors, the data scanning module to receive a data stream input containing a plurality of program elements and to scan the data stream input to identify data type definitions and usages of the data types;
   a data listening module, the data listening module to receive the identified data type definitions and data type usages and to generate a data stream output containing identified data type definitions and usages of the data types and
   wherein the plurality of program elements comprises Java class file program elements.

8. The system of claim 7, further comprising a configuration, the operation of the data scanning module being based at least in part on the configuration.

9. The system of claim 8, wherein the configuration comprises a scanner configuration associated with the data scanning module and a data mode configuration associated with the data listening module.

10. The system of claim 9, further comprising a parsing module to parse data type definitions in the data stream input.

11. The system of claim 7, wherein the data stream input and the data stream output use the same format.

12. An article of manufacture comprising:
   a computer-readable medium including instructions that, when accessed by a processor, cause the computer to perform operations comprising:
   receiving a data stream input at a scanner component, the data stream input representing a plurality of computer program elements;
   scanning the data stream input for data types, scanning the data stream input including:
   encountering a definition of a data type,
   determining whether to process program elements within the data type, and
   if there is a determination to process the program elements in the data type, scanning the program elements of the data type to identify usages of the data type; and providing the identified data type usages to a listening component;
   wherein the medium further includes instructions that, when accessed by a processor, cause the computer to perform operations comprising:

generating a data stream output from the listening component containing identified data type definitions and usages of the data types; and wherein the plurality of program elements comprises Java class file program elements.

13. The article of manufacture of claim 12 wherein the data stream output and the data stream input have the same data format.

14. The article of manufacture of claim 12, wherein scanning of program elements is based at least in part on a configuration.

15. The article of manufacture of claim 14, wherein the configuration includes a scanner configuration and a data mode configuration.

16. The article of manufacture of claim 12, wherein the medium further includes instructions that, when accessed by a processor, cause the computer to perform operations comprising:

converting a set of class files into the data stream input.

* * * * *